J. B. Blair,
Pencil.

No. 66,938.  Patented July 23, 1867.

United States Patent Office.

J. B. BLAIR, OF PHILADELPHIA, PENNSYLVANIA.

Letters Patent No. 66,938, dated July 23, 1867.

RUBBER HEAD FOR LEAD-PENCILS.

*The Schedule referred to in these Letters Patent and making part of the same.*

TO ALL PERSONS TO WHOM THESE PRESENTS SHALL COME:

Be it known that I, J. B. BLAIR, of the city and county of Philadelphia, and State of Pennsylvania, have invented a new and useful Cap or Rubber Head to be applied to Lead-Pencils, etc., for the purpose of rubbing out pencil marks; and I do hereby declare the same to be fully described in the following specification, and represented in the accompanying drawings, of which—

Figure 1:
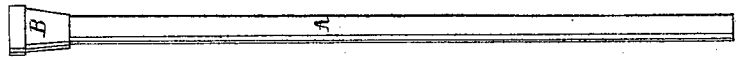
Figure 1 is an external view of a pencil as provided with a rubber or elastic erasive head constructed in accordance with my invention.
Figure 2:
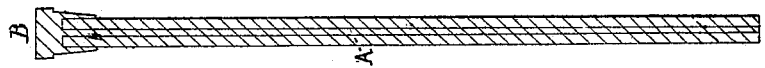
Figure 2 is a longitudinal section of the same.

The nature of my invention is to be found in a new and useful or improved rubber or erasive head for lead-pencils, etc.; and consists in making the said head of any convenient external form, and forming a socket longitudinally in the same to receive one end of a lead-pencil or a tenon extending from it.

In the said drawings, A denotes a lead-pencil, and B one of my erasive heads as applied thereto. The said head may have a flat top surface, or its top may be of a semicircular or a conical shape, or any other that may be desirable. Within one end of the said head I form a cylindrical or other proper-shaped cavity. This socket I usually make about two-thirds through the head, and axially thereof; but, if desirable, the socket or bore may extend entirely through the said head. The diameter of the socket should be a very little smaller than that of the pencil to be inserted in it. The elastic erasive head so made is to fit upon a lead-pencil at or near one end thereof, and to be so made as to surround the part on which it is to be placed, and be held thereon by the inherent elasticity of the material of which the head may be composed. The said head is to be composed of India rubber, or India rubber and some other material which will increase the erasive properties of the head, (such as powdered emery, for instance.) The drawings exhibit the elastic head so made as to cover the end as well as to extend around the cylindric sides of the pencil, but it is evident that the contour of the said head may be varied to suit the fancy or the taste of an artist or other person, and I do not limit my invention to the precise forms shown in the drawings, as it may have such, or any other convenient for the purpose, so long as it is made so as to encompass the pencil and present an erasive surface about the sides of the same.

Figure 3:
Figure 3 shows the head, as made, in a somewhat modified form, or with its upper end terminating in a cone.

A head made in my improved manner, and applied to a pencil as above set forth, is of great practical utility and advantage to book-keepers, accountants, and various other persons. The pointed form of the head, as shown in fig. 3, will be found very useful for draughtsmen in erasing lines from their drawings when it may be desirable not to erase other lines in close proximity to that which it is desirable to erase. The elastic or rubber pencil-head, made as above set forth, may be applied not only to lead-pencils but to ink-erasers, and other articles of like character.

I claim as a new article of manufacture—

An elastic erasive pencil-head, made substantially in manner as described.

J. B. BLAIR.

Witnesses:
  DAN'L M. ZIMMERMAN,
  B. A. LATIMER.